(12) United States Patent
Milburn

(10) Patent No.: US 8,162,202 B2
(45) Date of Patent: Apr. 24, 2012

(54) METHOD OF MANUFACTURING AN ARTICLE BY DIFFUSION BONDING AND SUPERPLASTIC FORMING

(75) Inventor: Richard G. Milburn, Nottingham (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 13/102,483

(22) Filed: May 6, 2011

(65) Prior Publication Data

US 2011/0297734 A1    Dec. 8, 2011

(30) Foreign Application Priority Data

Jun. 3, 2010 (GB) .................................. 1009299.7

(51) Int. Cl.
   *B23K 20/00* (2006.01)
   *B23K 20/02* (2006.01)
(52) U.S. Cl. .................. 228/234.1; 228/227; 228/228; 228/233.1; 228/235.1; 228/127
(58) Field of Classification Search .......... 228/227, 228/228, 233.1, 234.1, 235.1, 262.1, 127
   See application file for complete search history.

(56) References Cited

U.S. PATENT DOCUMENTS

| | | | |
|---|---|---|---|
| 4,304,350 A | 12/1981 | Paez et al. | |
| 5,275,325 A | 1/1994 | Stracquadaini | |
| 5,692,406 A | 12/1997 | Yasui | |
| 6,467,168 B2 * | 10/2002 | Wallis | 29/889.721 |
| 2001/0022023 A1 | 9/2001 | Wallis | |

FOREIGN PATENT DOCUMENTS

| | | |
|---|---|---|
| EP | 1 508 400 A1 | 2/2005 |
| GB | 2 289 429 A | 11/1995 |
| GB | 2 306 353 A | 5/1997 |

OTHER PUBLICATIONS

Search Report for priority British Patent Application No. 1009299.7, dated Jul. 15, 2010.

* cited by examiner

*Primary Examiner* — Jessica L Ward
*Assistant Examiner* — Erin Saad
(74) *Attorney, Agent, or Firm* — Oliff & Berridge, PLC

(57) ABSTRACT

In a method of manufacturing an article (28) by diffusion bonding and superplastic forming stop off material (122) is applied to prevent diffusion bonding in a predetermined pattern on a first surface (106) of a first metal workpiece (100) and the predetermined pattern is spaced from the edges of the first surface (106) of the first metal workpiece (100). Stop off material (124) to prevent diffusion bonding is applied in a predetermined position on the first surface (106) of the first metal workpiece (100) and the predetermined position extends from the predetermined pattern of stop of material (122) on the first surface (106) of the first metal workpiece (100) towards one edge of the first surface (106) of the first metal workpiece (100). A recess (130, 132) is provided in a second predetermined position on the second surface (108) of the first metal workpiece (100) or a fourth surface (112) of a second metal workpiece (102), the recess (130,132) extends towards the same edge of the first metal workpiece (100) or a corresponding edge of the second metal workpiece (102). The first and second metal workpieces (100, 102) are diffusion bonded together. During superplastic forming the recess (130, 132) and the stop off material (124) in the predetermined position define an inflation passage (148) for superplastic forming of the metal workpieces (100, 102) to a hollow article (28).

14 Claims, 8 Drawing Sheets

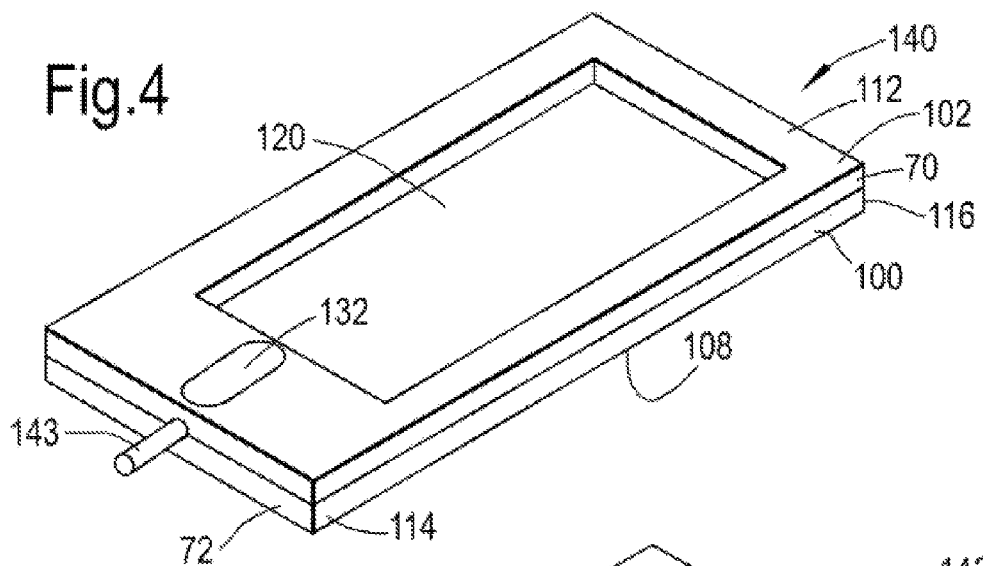
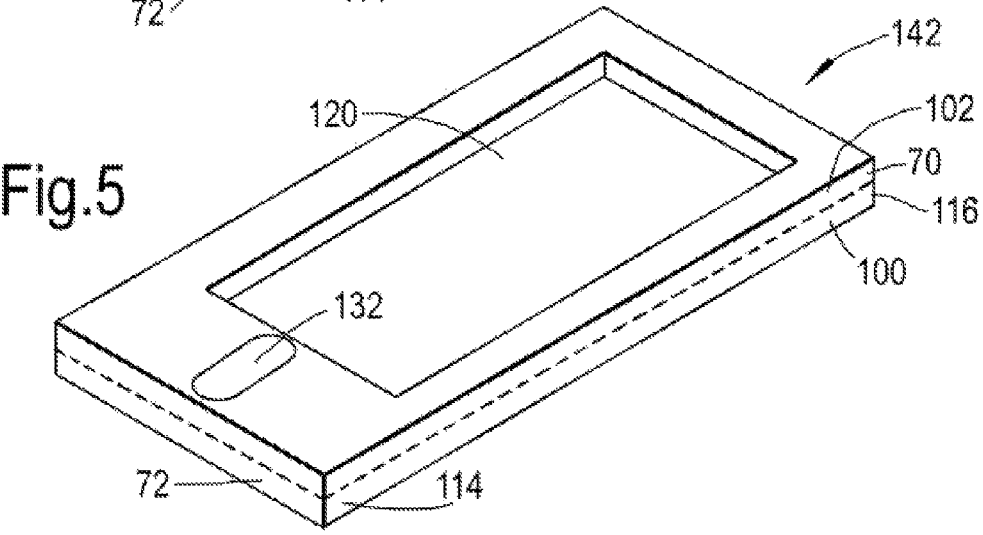
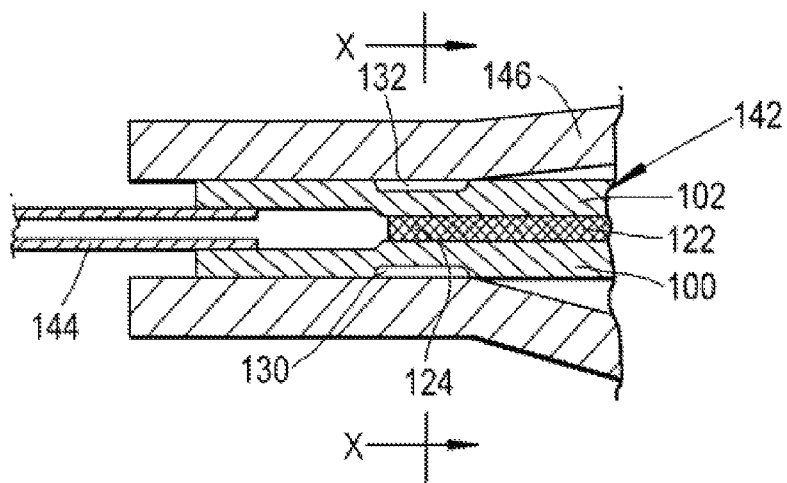

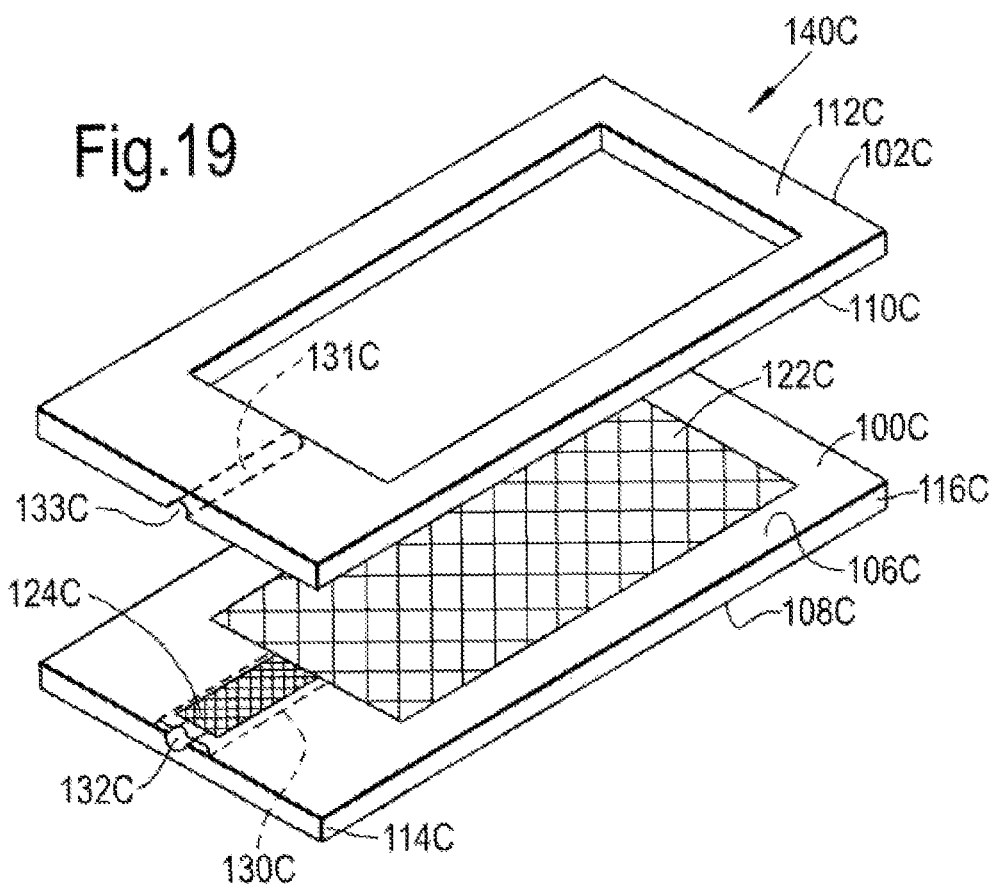
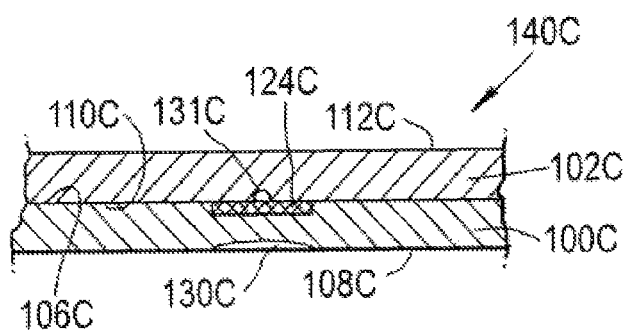
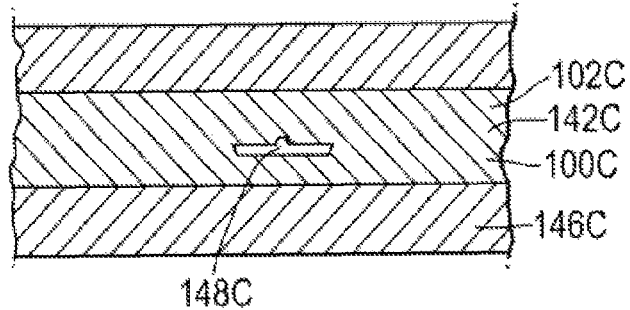

METHOD OF MANUFACTURING AN ARTICLE BY DIFFUSION BONDING AND SUPERPLASTIC FORMING

The present invention relates to a method of manufacturing an article by diffusion bonding and superplastic forming and in particular to a method of manufacturing gas turbine engine fan blades, or fan outlet guides, by diffusion bonding and superplastic forming.

It is known to manufacture gas turbine engine fan blades, or fan outlet guide vanes, by diffusion bonding and superplastic forming. A stop off material is provided in a predetermined pattern on one of the abutting surfaces of the diffusion bondable and superplastically formable metal workpieces to prevent diffusion bonding. The diffusion bondable and superplastically formable metal workpieces are superplastically formed in those regions where the stop off material was applied in the predetermined pattern.

A problem with this method is that the cross-sectional area of an inflation slot, provided on an interior surface of one of the workpieces, to provide an inflation gas to the predetermined pattern of stop off material to superplastically form the workpieces is reduced in size during the diffusion bonding of the workpieces. After completion of the superplastic forming process it is necessary to ensure that all of the inflation gas has escaped from within the interior of the superplastically formed workpieces and the reduced cross-sectional area of the inflation slot increases the superplastic forming time and reduces the manufacturing rate of components. In addition after the superplastically formed workpieces have been removed from the superplastic forming dies the inflation gas within the interior of the superplastically formed workpieces contracts and draws air into the interior of the superplastically formed workpieces. If the air entry is restricted due to the reduced cross-sectional area of the inflation slot then a pressure differential is generated, which sucks in the faces of the superplastically formed workpieces to produce a component with an under formed profile. The effects of an inflation slot with a reduced cross-sectional area increase with increasing size and internal volume of a fan blade, or fan outlet guide vane.

Accordingly the present invention seeks to provide a novel method of manufacturing an article by diffusion bonding and superplastic forming which reduces, preferably overcomes, the above mentioned problem.

Accordingly the present invention provides a method of manufacturing an article by diffusion bonding and superplastic forming comprising the steps of:— a) providing at least a first metal workpiece and a second metal workpiece, the first metal workpiece having a first surface and a second surface, the second metal workpiece having a third surface and a forth surface, b) applying stop off material to prevent diffusion bonding in a predetermined pattern on the first surface of the first metal workpiece, the predetermined pattern being spaced from the edges of the first surface of the first metal workpiece, c) applying stop off material to prevent diffusion bonding in a predetermined position on the first surface of the first metal workpiece or the third surface of the second metal workpiece, the predetermined position extending from the predetermined pattern of stop off material on the first surface of the first metal workpiece towards one edge of the first surface of the first metal workpiece, d) providing a recess in a second predetermined position on the first surface of the first metal workpiece, the second surface of the first metal workpiece, the third surface of the second metal workpiece or the fourth surface of the second metal workpiece, the recess extending towards the same edge of the first metal workpiece or a corresponding edge of the second metal workpiece, e) assembling at least the first metal workpiece and the second metal workpiece in a stack such that the first surface of the first metal workpiece faces the third surface of the second metal workpiece and the recess in the second predetermined position on the first surface of the first metal workpiece, the second surface of the first metal workpiece, the third surface of the second metal workpiece or the fourth surface of the second metal workpiece is aligned with the stop off material arranged in the predetermined position on the first surface of the first metal workpiece, f) sealing the edges of the first metal workpiece to the edges of the second metal workpiece to form a sealed assembly, g) evacuating the sealed assembly, h) heating and externally pressurising the sealed assembly to diffusion bond the first and second metal workpieces together except in areas other than the predetermined pattern and predetermined position to form a sealed integral structure, i) connecting an inflation pipe to the stop off material in the first predetermined position on the first surface of the first metal workpiece of the sealed integral structure, j) heating and internally pressurising the sealed integral structure to cause the first metal workpiece, or the second metal workpiece, where the stop off material was arranged in the predetermined position and the recess was arranged in the second predetermined position, to be hot formed to create an inflation passage within the sealed integral structure, k) heating and internally pressurising the sealed integral structure to cause the first metal workpiece and/or the second metal workpiece where the stop off material was arranged in the predetermined pattern to be superplastically formed to create a hollow metal article.

Step d) may comprise providing a first recess in a second predetermined position on the second surface of the first metal workpiece and a second recess in a third predetermined position on the fourth surface of the second metal workpiece, the first recess extending towards the same edge of the first metal workpiece and the second recess extending towards a corresponding edge of the second metal workpiece, step e) comprises assembling at least the first metal workpiece and the second metal workpiece in stack such that the first recess in the second predetermined position on the second surface of the first metal workpiece and the second recess in fourth surface of the second metal workpiece are aligned with the stop off material arranged in the predetermined position on the first surface of the first metal workpiece and step j) comprises heating and internally pressurising the sealed integral structure to cause the first metal workpiece and the second metal workpiece, where the stop off material was arranged in the predetermined position, the first recess was arranged in the second predetermined position and the second recess was arranged in the third predetermined position, to be hot formed to create an inflation passage within the sealed integral structure.

Step d) may comprise providing a first recess in a second predetermined position on the first surface of the first metal workpiece and a second recess in a third predetermined position on the third surface of the second metal workpiece, the first recess extending towards the same edge of the first metal workpiece and the second recess extending towards a corresponding edge of the second metal workpiece, step e) comprises assembling at least the first metal workpiece and the second metal workpiece in stack such that the first recess in the second predetermined position on the first surface of the first metal workpiece and the second recess in third surface of the second metal workpiece are aligned with the stop off material arranged in the predetermined position on the first surface of the first metal workpiece and step j) comprises heating and internally pressurising the sealed integral structure to cause the first metal workpiece and the second metal workpiece, where the stop off material was arranged in the predetermined position, the first recess was arranged in the second predetermined position and the second recess was arranged in the third predetermined position, to be hot formed to create an inflation passage within the sealed integral structure.

Step a) may comprise providing a third metal workpiece, the third metal workpiece having a fifth surface and a sixth surface, step b) may comprise applying stop off material to prevent diffusion bonding in a predetermined pattern on the third surface of the second metal workpiece, the predetermined pattern being spaced from the edges of the third surface of the second metal workpiece, step e) may comprise assembling the first metal workpiece, the second metal workpiece and the third metal workpiece in a stack such that the first surface of the first metal workpiece faces the fifth surface of the third metal workpiece, the sixth surface of the third metal workpiece faces the third surface of the second metal workpiece and the recess in the second predetermined position on the first surface of the first metal workpiece, the second surface of the first metal workpiece, the third surface of the second metal workpiece or the fourth surface of the second metal workpiece is aligned with the stop off material arranged in the predetermined position on the first surface of the first metal workpiece.

The article may be a fan blade or a fan outlet guide vane.

The article may be a heat exchanger, a compressor blade or a compressor vane.

The first metal workpiece and/or the second metal workpiece may comprise a titanium alloy. The titanium alloy may consist of 6 wt % vanadium, 4 wt % aluminium and the balance titanium, minor elemental additions and incidental impurities.

Step d) may comprise providing a recess in a second predetermined position on the first surface of the first metal workpiece, the recess extending towards the same edge of the first metal workpiece.

Step d) may comprise providing a recess in a second predetermined position on the second surface of the first metal workpiece, the recess extending towards the same edge of the first metal workpiece.

Step h) may comprise heating to a temperature greater than 850° C. and applying a pressure greater than $20.26 \times 10^5$ $Nm^{-2}$. Step h) may comprise heating to a temperature between 900° C. and 950° C. and applying a pressure between $20.26 \times 10^5$ $Nm^{-2}$ and $30.39 \times 10^5$ $Nm^{-2}$.

Step j) and step k) may comprise heating to a temperature greater than 850° C. Step j) and step k) may comprise heating to a temperature between 900° C. and 950° C.

Step d) may comprise providing a recess in a second predetermined position which extends to the same edge of the first metal workpiece.

The method may comprise providing an inflation slot on the first surface or the third surface, the inflation slot extending from the edge of the first metal workpiece or third metal workpiece to interconnect with the stop off material in the predetermined pattern on the first surface of the first metal workpiece.

Alternatively the present invention provides a method of manufacturing an article by diffusion bonding and superplastic forming comprising the steps of:— a) providing at least a first metal workpiece and a second metal workpiece, the first metal workpiece having a first surface and a second surface, the second metal workpiece having a third surface and a fourth surface, b) providing a recess in the first surface or the second surface of the first metal workpiece, the recess extending from a first predetermined position on the first surface or the second surface of the first metal workpiece towards an edge of the first metal workpiece, c) applying stop off material to prevent diffusion bonding in a predetermined pattern on the first surface of the first metal workpiece, the predetermined pattern being spaced from the edges of the first surface of the first metal workpiece, d) applying stop off material to prevent diffusion bonding on the first surface of the first metal workpiece, the stop off material extending from a second predetermined position on the first surface of the first metal workpiece towards the edge of the first metal workpiece, the second predetermined position contacts the predetermined pattern of stop off material, e) assembling at least the first metal workpiece and the second metal workpiece in a stack such that the first surface of the first metal workpiece faces the third surface of the second metal workpiece and the recess in the first surface or the second surface of the first metal workpiece is aligned with the stop off material on the first surface of the first metal workpiece extending from the second position towards the edge of the first metal workpiece, f) sealing the edges of the first metal workpiece to the edges of the second metal workpiece to form a sealed assembly, g) evacuating the sealed assembly, h) heating and externally pressurising the sealed assembly to diffusion bond the first and second metal workpieces together except in areas other than the preselected areas to form a sealed integral structure, i) connecting an inflation pipe to the stop off material in the first predetermined position on the first surface of the first metal workpiece of the sealed integral structure, j) heating and internally pressurising the sealed integral structure to cause the first metal workpiece, or the second metal workpiece, where the stop off material was arranged in the predetermined position and the recess was arranged in the second predetermined position, to be hot formed to create an inflation passage within the sealed integral structure, k) heating and internally pressurising the sealed integral structure to cause the first metal workpiece and/or the second metal workpiece where the stop off material was arranged in the predetermined pattern to be superplastically formed to create a hollow metal article.

The present invention will be more fully described by way of example with reference to the accompanying drawings, in which:—

FIG. 4 is a perspective view of a sealed assembly comprising the stack of two metal workpieces which are to be diffusion bonded and superplastically formed to form an article according to the present invention.

FIG. 5 is a perspective view of the two metal workpieces shown in FIG. 4 showing a sealed integral structure after a diffusion bonding step has been performed.

FIG. 6 is a cross-sectional view of the sealed integral structure shown in FIG. 5 in a superplastic forming die before a superplastic forming step.

FIG. 19 is an exploded view of an alternative stack of two metal workpieces which are to be diffusion bonded and superplastically formed to form an article according to the present invention.

FIG. 20 is a cross-sectional view through a sealed assembly formed from the stack of metal workpieces shown in FIG. 19.

FIG. 21 is a cross-sectional view through a sealed integral structure in a superplastic forming die formed from the sealed assembly shown in FIG. 20 after diffusion bonding and superplastic forming.

Figure 1:
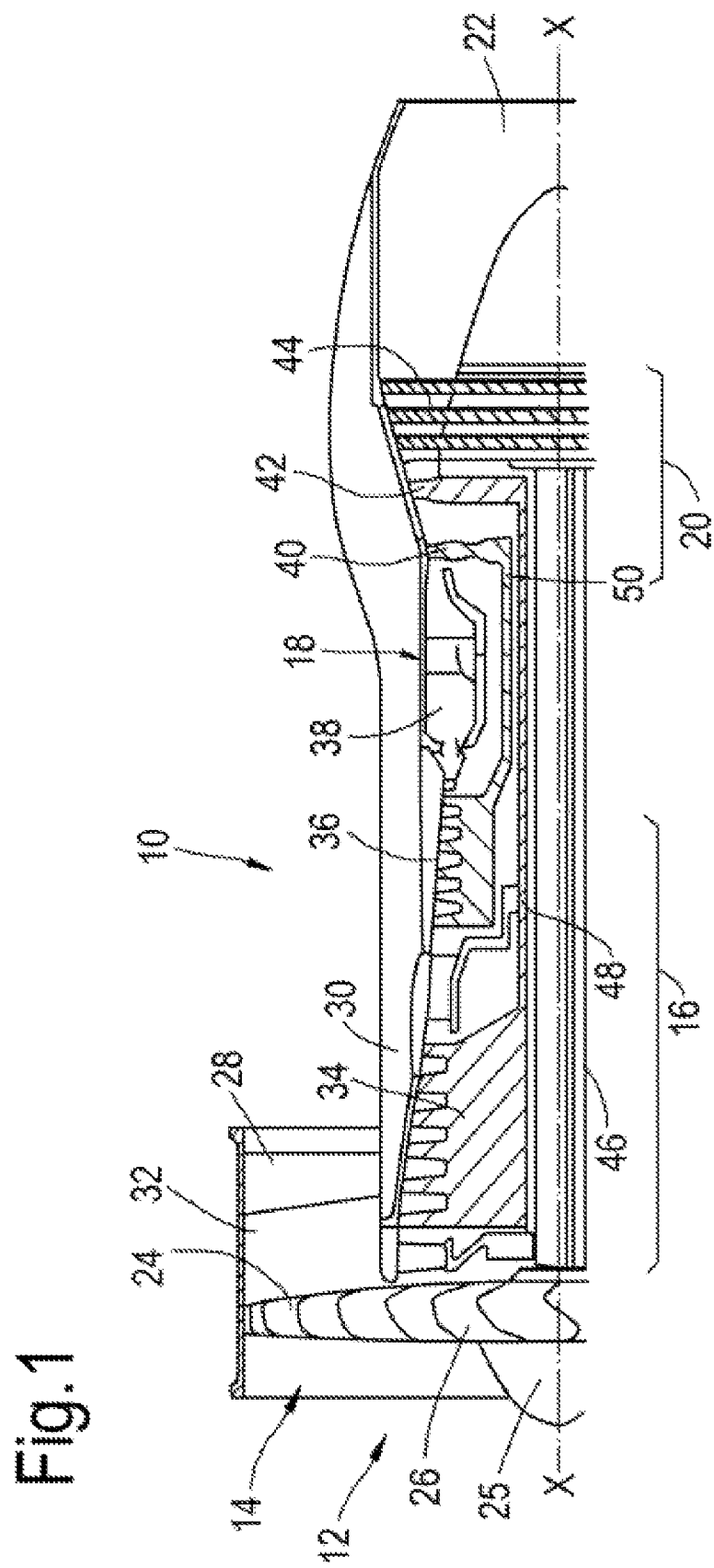
FIG. 1 is a partially cut away view of a turbofan gas turbine engine having an article manufactured by diffusion bonding and superplastic forming according to the present invention.

A turbofan gas turbine engine 10, as shown in FIG. 1, comprises in flow series an inlet 12, a fan section 14, a compressor section 16, a combustion section 18, a turbine section 20 and an exhaust 22. The fan section 14 includes a fan 24, which comprises a fan rotor 25 and a plurality of circumferentially spaced and radially outwardly extending fan blades 26. The fan section 14 also includes a plurality of fan outlet guide vanes 28 which extend radially between a core engine casing 30 and a fan casing 32. The compressor section 16 comprises an intermediate pressure compressor 34 and a high pressure compressor 36. The combustion section 16 comprises an annular combustion chamber 38 or a plurality of tubular combustion chambers arranged in an annular arrangement. The turbine section 18 comprises a high pressure turbine 40, an intermediate pressure turbine 42 and a low pressure turbine 44. The low pressure turbine 44 is arranged to drive the fan 24 via a shaft 46, the intermediate pressure turbine 42 is arranged to drive the intermediate pressure compressor 34 via a shaft 48 and the high pressure turbine 40 is arranged to drive the high pressure compressor 36 via a shaft 50. The turbofan gas turbine engine 10 operates quite conventionally and its operation will not be discussed further.

Figure 2:
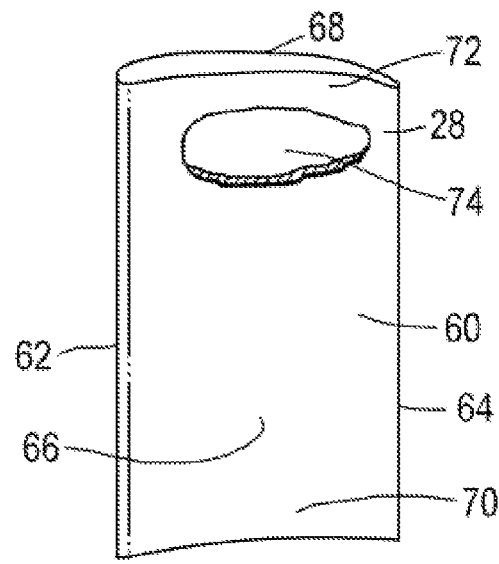
FIG. 2 is an enlarged view of an article manufactured by diffusion bonding and superplastic forming according to the present invention.

A fan outlet guide vane 28, as shown in FIG. 2, comprises an aerofoil shaped body 60 which has a leading edge 62, a trailing edge 64, a concave surface 66, a convex surface 68, a radially inner end 70 and a radially outer end 72. The fan outlet guide vane 28 has an internal cavity 74 and the internal cavity 74 may be hollow or may be filled with a vibration damping medium. The fan outlet guide vane 28 has been manufactured using the diffusion bonding and superplastic forming process according to the present invention.

Figure 3:
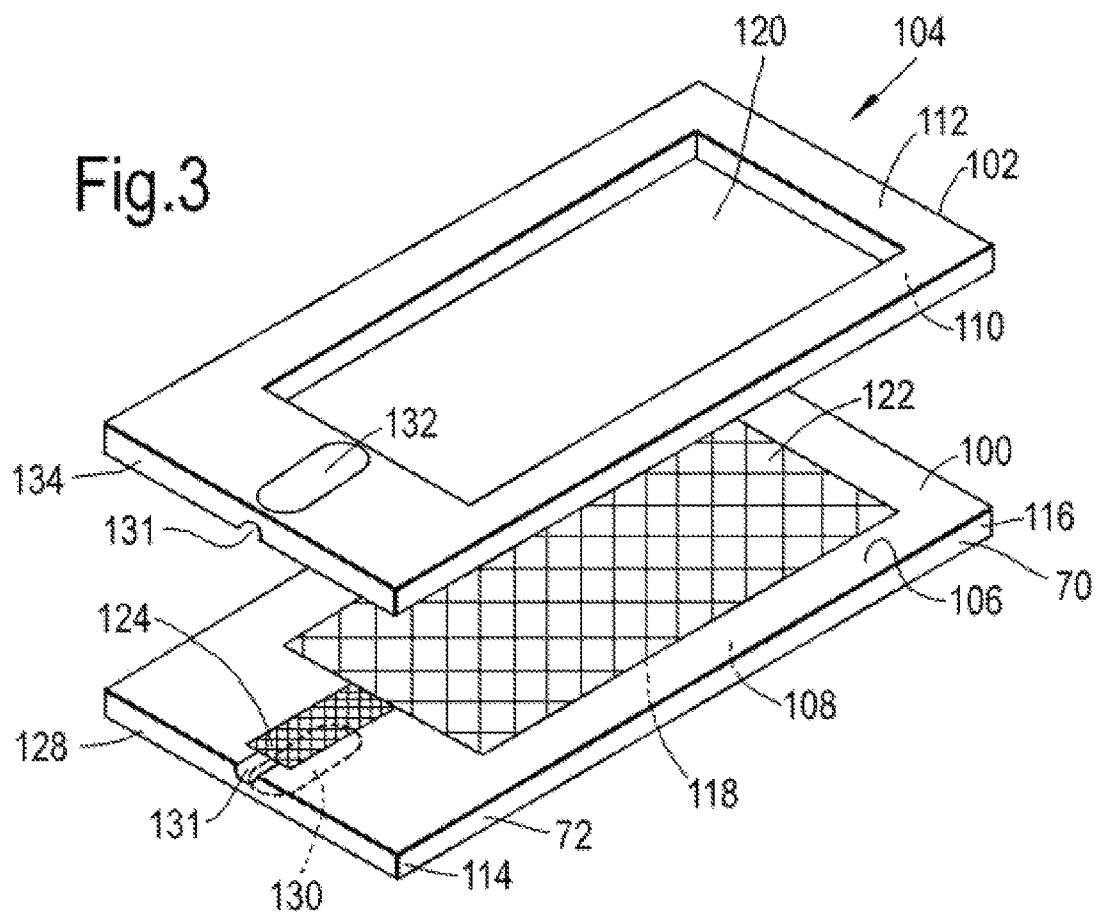
FIG. 3 is an exploded view of a stack of two metal workpieces which are to be diffusion bonded and superplastically formed to form an article according to the present invention.

In FIG. 3 two titanium alloy workpieces 100 and 102 are assembled into a stack 104. The titanium alloy workpiece 100 has a first surface 106 and a second surface 108 and the titanium alloy workpiece 102 has a third surface 110 and a fourth surface 112. The first surface 106 is a flat surface and the third surface 110 is a flat surface. The first surface 106 of the titanium alloy workpiece 100 is arranged to abut the third surface 110 of the titanium alloy workpiece 102. The titanium alloy workpieces 100 and 102 taper, increase in thickness, from end 116 to end 114.

The titanium alloy workpieces 100 and 102 are produced by cutting an original parallelepiped block of titanium alloy long an inclined plane to form the two longitudinally tapering titanium alloy workpieces 100 and 102 as described more fully in our UK patent GB2306353B. Alternatively the titanium alloy workpieces 100 and 102 may be separate blocks of titanium alloy.

Prior to assembling the titanium alloy workpieces 100 and 102 into the stack 104, the titanium alloy workpiece 100 is machined in a region 118, centrally of the second surface 108 of the titanium alloy workpiece 100 and the titanium alloy workpiece 102 is machined in a region 120, centrally of the fourth surface 112 of the titanium alloy workpiece 102. The regions 118 and 120 are contoured to produce a variation in the mass distribution of the fan outlet guide vane 28 from leading edge 62 to trailing edge 64 and from radially inner end 70 to radially outer end 72 by varying the depth of machining. The machining of the regions 118 and 120 of the titanium alloy workpieces 100 and 102 respectively is by milling, electrochemical machining, chemical machining, electro-discharge machining or any other suitable machining process.

The abutting surfaces, the first surface 106 and the third surface 110 of the titanium alloy workpieces 100 and 102 respectively are prepared for diffusion bonding by chemical cleaning.

A stop off material 122 to prevent diffusion bonding is applied in a predetermined pattern on one of the abutting surfaces 106 and 110, in this example the first surface 106 of the titanium alloy workpiece 100, the predetermined pattern of stop off material 122 is spaced from the edges of the first surface 106 of the titanium alloy workpiece 100. In addition a stop off material 124 to prevent diffusion bonding is applied in a predetermined position on one of the abutting surfaces 106 and 110, in this example the first surface 106 of the titanium alloy workpiece 100, the predetermined position extends from the predetermined pattern of stop of material 122 on the first surface 106 of the titanium alloy workpiece 100 towards one edge 128 of the first surface 106 of the titanium alloy workpiece 100. The edge 128 in this example is at the end 114. The stop off material 122 and 124 may comprise powdered yttria in a binder and solvent e.g. the stop off known as "Stopyt 62A". The predetermined pattern of stop off material 122 is provided to define the internal cavity 74 in the finished fan outlet guide vane 28. The stop off material 124 is provided to define a flow path, an inflation passage, for a fluid to flow to the predetermined pattern of stop off material 122 in order to allow the fluid to superplastically inflate the titanium alloy workpieces 100 and 102 away from each other.

Figure 9:
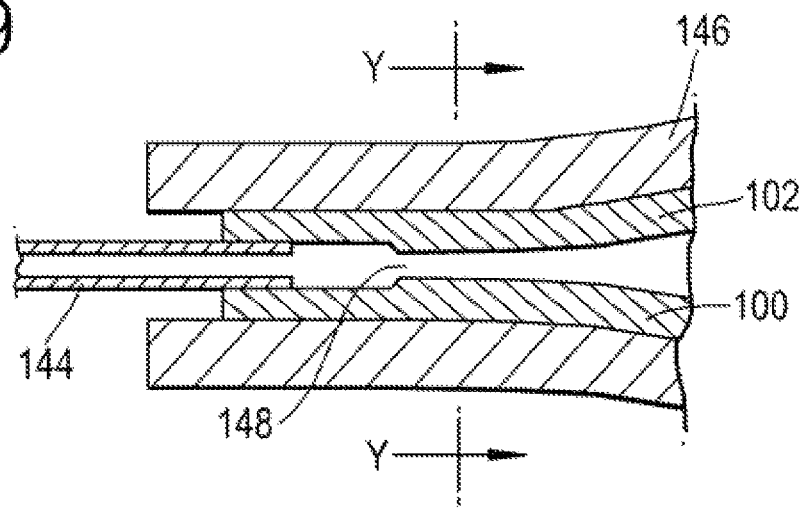
FIG. 9 is a cross-sectional view of the sealed integral structure shown in FIG. 5 in a superplastic forming die at the end of a superplastic forming step.

A first recess 130 is machined in a second predetermined position on the second surface 108 of the titanium alloy workpiece 100 and the recess 130 extends towards the edge 128 of the titanium alloy workpiece 100. A second recess 132 is machined in a third predetermined position on the fourth surface 112 of the titanium alloy workpiece 102 and the second recess extends towards a corresponding edge 134 of the third surface 110 of the titanium alloy workpiece 102. The edge 134 in this example is at the end 114. The first and second recesses 130 and 132 may be any suitable shape in cross-section, but it is preferred that they are a sector of a circle and that the depth of the first and second recesses 130 and 132 are the same such that an inflation passage with a lenticular cross-section is formed after diffusion bonding and superplastic forming, as shown in FIG. 9.

The titanium alloy workpiece 100 and the titanium alloy workpiece 102 are assembled into the stack 104 such that the first surface 106 of the titanium alloy workpiece 100 faces the third surface 110 of the titanium alloy workpiece 102 and such that the first recess 130 in the second predetermined position on the second surface 108 of the titanium alloy workpiece 100 and the second recess 132 in the third predetermined position on the fourth surface 112 of the titanium alloy workpiece 102 are aligned with the stop off material 124 arranged in the predetermined position on the first surface 106 of the titanium alloy workpiece 100. Thus, the stop off material 124, the first recess 130 and the second recess 132 are arranged in a plane P extending perpendicularly to the planes of the titanium alloy workpieces 100 and 102.

The edges of the titanium alloy workpiece 100 and the edges of the titanium alloy workpiece 102 are sealed together to form a sealed assembly 140 as shown in FIG. 4. The edges of the titanium alloy workpiece 100 and the edges of the titanium alloy workpiece 102 are welded together to form a sealed assembly 140 except for an evacuation pipe 143 which is connected to the sealed assembly 140 and the pipe 143 is welded around its periphery to the titanium alloy workpieces 100 and 102. The evacuation pipe 143 locates in part circular slots 131 in the edges 128 and 134 of the first and second titanium alloy workpieces 100 and 102 respectively. One end of the pipe 143 interconnects with the stop off material 124 and 122 between the titanium alloy workpieces 100 and 102, in other words the stop off material 124 extends towards the edge 128 as far as the part circular slot 131. The pipe 143 is connected to the end 114 at what will be the radially outer end of the fan outlet guide vane 28. The pipe 143 is connected to a vacuum pump, which is used to evacuate the interior of the sealed assembly 140. In some instance inert gas, for example argon, may be supplied to the interior of the sealed assembly 140 and the evacuating and supplying of inert gas to the interior of the sealed assembly 140 may be repeated several times to ensure that most, or substantially all, traces of oxygen are removed from the interior of the sealed assembly 140 and the sealed assembly 140 is finally evacuated.

The evacuated sealed assembly 140 is then placed in an oven. The sealed assembly 140 is then heated at a temperature of 250° C. to 350° C. to evaporate the binder from the stop off material 122 and 124. During the baking out of the binder the interior of the sealed assembly 140 is continuously evacuated to remove the binder from between the titanium alloy workpieces 100 and 102. After all the binder has been removed from the interior of the sealed assembly 140, the pipe 143 is sealed so that there is a vacuum in the sealed assembly 140.

The sealed assembly 140 is transferred to an autoclave, or a HIP vessel, and the sealed assembly 140 is heated and externally pressurised to diffusion bond the titanium alloy workpieces 100 and 102 together in areas other than the predetermined areas, e.g. the stop off material 122 and 124 in the predetermined pattern and the predetermined position, to form a sealed integral structure 142 as shown in FIG. 5. The sealed assembly 140 is heated to a temperature greater than 850° C. and the pressure is greater than 20 atmospheres, 294 lbs per square inch ($20.26 \times 10^5$ $Nm^{-2}$) and held at that temperature and pressure for a predetermined time. Preferably the temperature is between 900° C. and 950° C. and the pressure is between 294 lbs per square inch ($20.26 \times 10^5$ $Nm^{-2}$) and 441 lbs per square inch ($30.39 \times 10^5$ $Nm^{-2}$).

The sealed integral structure 142 may then be placed in a hot creep forming die and hot creep formed, or twisted, to produce an aerofoil shape. During the hot creep forming process the sealed integral structure 142 is heated to a temperature of 740° C.

Figure 7:
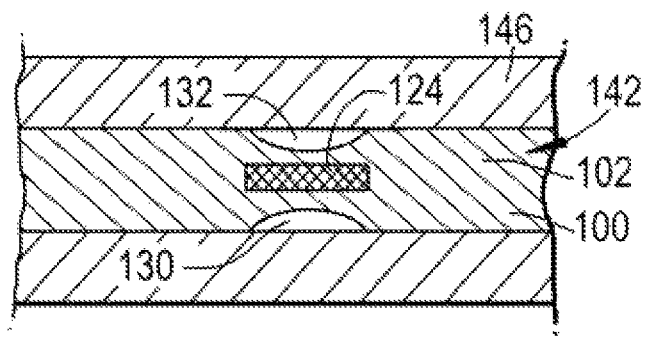
FIG. 7 is a cross-sectional view along line X-X of the sealed integral structure in a superplastic forming die shown in FIG. 6.
Figure 8:
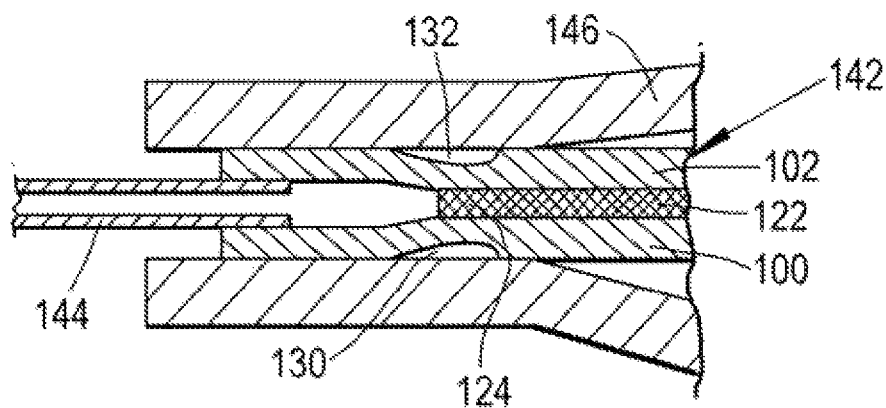
FIG. 8 is a cross-sectional view of the sealed integral structure shown in FIG. 5 in a superplastic forming die at the start of a superplastic forming step.
Figure 10:
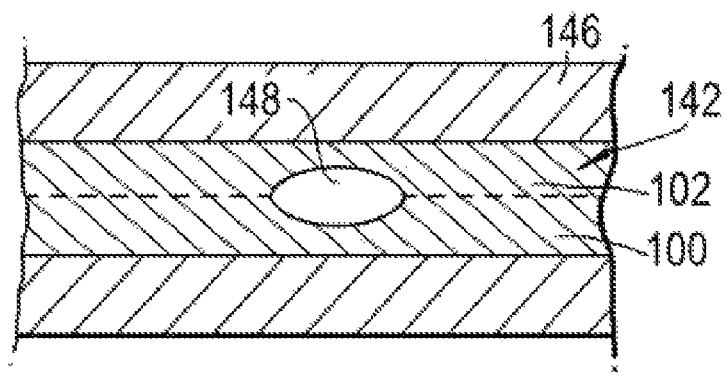
FIG. 10 is a cross-sectional view along line Y-Y of the sealed integral structure in a superplastic forming die shown in FIG. 9.

Then the sealed integral structure 142 is placed in a superplastic forming die 146, as shown in FIGS. 6 and 7, and an inflation pipe 144 is connected to the stop off material 124 in the first predetermined position on the first surface 106 of the titanium alloy workpiece 100 of the sealed integral structure 142. The inflation pipe 144 may be positioned in an aperture drilled in the appropriate end of the sealed integral structure 142. The sealed integral structure 142 is heated and a fluid, an inert gas for example argon, is supplied through the inflation pipe 144 to internally pressurise the sealed integral structure 142 to cause the titanium alloy workpiece 100 and/or the titanium alloy workpiece 102, where the stop off material 124 was arranged in the predetermined pattern and the first recess 130 was arranged in the second predetermined position and the second recess 132 in the third predetermined position, to be hot formed onto, to abut, the surfaces of the superplastic forming die 146 to create an inflation passage 148 within the sealed integral structure 142 as shown in FIGS. 8, 9 and 10. The sealed integral structure 142 is heated and internally pressurised to cause the titanium alloy workpiece 100 and/or the titanium alloy workpiece 102 where the stop off material 122 was arranged in the predetermined pattern to be superplastically formed onto the surfaces of the superplastic forming die 146 to create a hollow fan outlet guide vane 28 as shown in FIG. 2. The sealed integral structure 142 is heated to a temperature greater than 850° C., preferably the temperature is between 900° C. and 950° C. The inflation passage 148 is formed during the supply of high pressure inflation gas to the interior of the sealed integral structure 142.

In an alternative method of manufacturing the fan outlet guide vane 28 instead of machining a first recess 130 in a second predetermined position on the second surface 108 of the titanium alloy workpiece 100 and the recess 130 extends towards the edge 128 of the titanium alloy workpiece 100 it is equally possible to machine the first recess 130 in a second predetermined position on the first surface 106 of the titanium alloy workpiece 100. Instead of machining a second recess 132 in a third predetermined position on the fourth surface 112 of the titanium alloy workpiece 102 and the second recess extends towards a corresponding edge 134 of the third surface 110 of the titanium alloy workpiece 102 it is equally possible to machine the second recess 132 in a third predetermined position on the third surface 110 of the titanium alloy workpiece 102. In this method the stop off material 124 in the first predetermined position is located on the first surface 106 in the first recess 130 or is located on the third surface 110 in the second recess 132. In this method the titanium alloy workpiece 100 and the titanium alloy workpiece 102 in the region of the first and second recesses 130 and 132 are superplastically formed towards each other, but are prevented from diffusion bonding due to the stop off material 124, such that a first recess 130' and a second recess 132' are formed in the second surface 108 and fourth surface 112 of the titanium alloy workpieces 100 and 102 respectively during the diffusion bonding of the titanium alloy workpieces 100 and 102. Thereafter during superplastic forming the first recess 130 and the second recess 132 are reformed to form the inflation passage.

In a further alternative method of manufacturing the fan outlet guide vane 28 the first recess 130 may be machined in a second predetermined position on the first surface 106 of the titanium alloy workpiece 100 and the second recess 132 may be machined in a third predetermined position on the fourth surface 112 of the titanium alloy workpiece 102.

Figure 11:
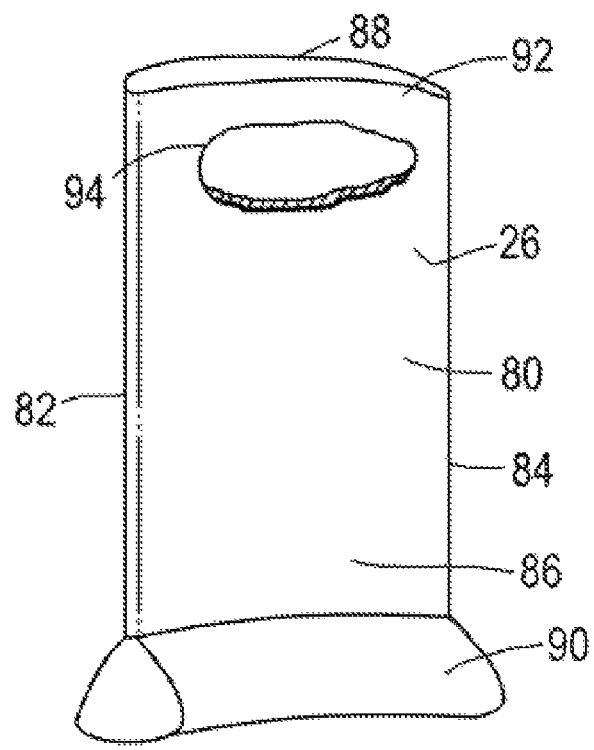
FIG. 11 is an enlarged view of another article manufactured by diffusion bonding and superplastic forming according to the present invention.

A fan blade 26, as shown in FIG. 11, comprises an aerofoil shaped body 80 which has a leading edge 82, a trailing edge 84, a concave surface 86, a convex surface 88, a root 90 at a radially inner end and a tip 92 at a radially outer end. The fan blade 26 has an internal cavity 94 and the internal cavity 94 may be hollow or may be filled with a vibration damping medium. The fan blade 26 has been manufactured using two titanium alloy workpieces and using the diffusion bonding and superplastic forming process according to the present invention as described with reference to FIGS. 2 to 5. However, in the case of a fan blade 26, the titanium alloy workpieces 100 and 102 taper, increase in thickness, from end 114 to end 116 and the pipe 143 is connected to the end 114 at what will be the radially outer end of the fan blade 26.

Figure 12:
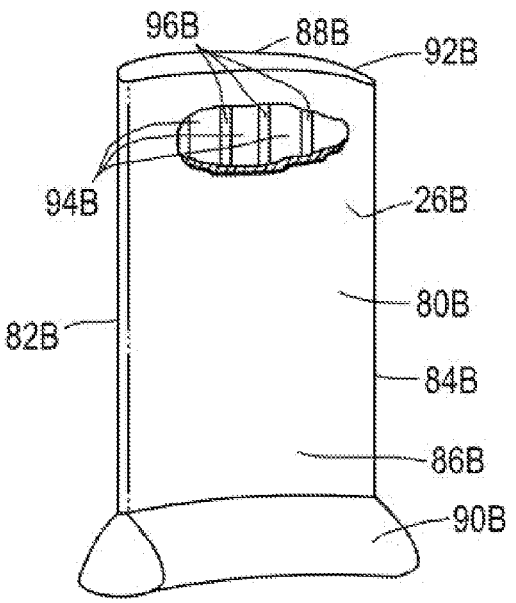
FIG. 12 is an enlarged view of a further article manufactured by diffusion bonding and superplastic forming according to the present invention.
Figure 13:
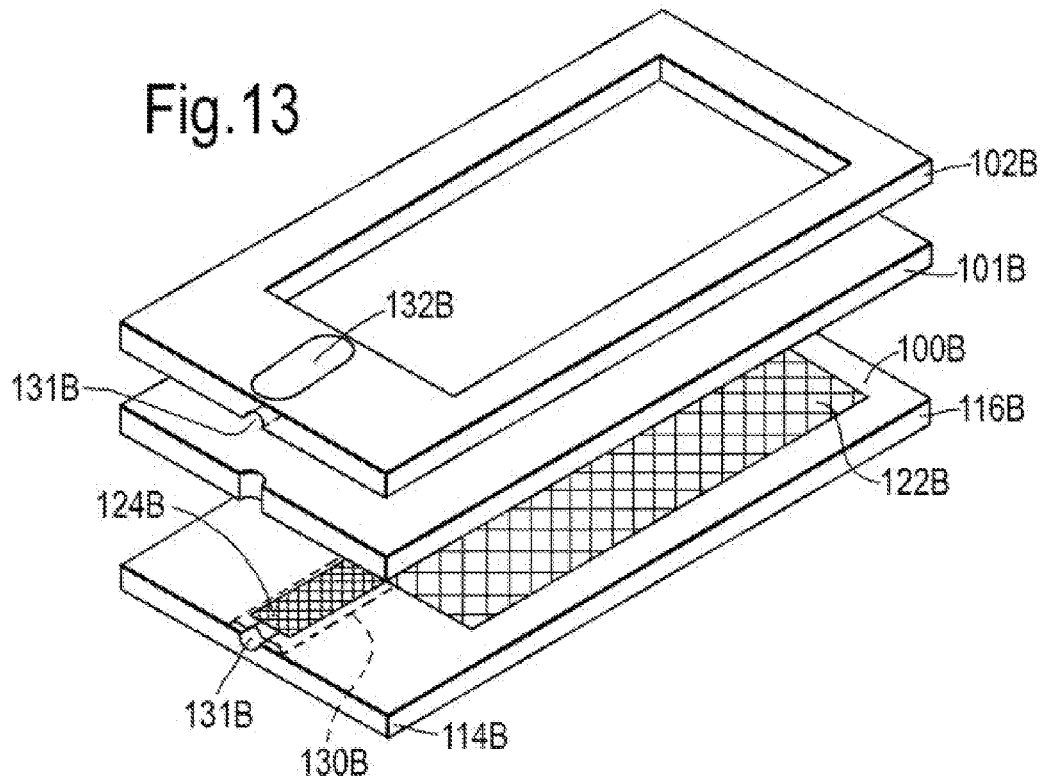
FIG. 13 illustrates an exploded view of a stack of three metal workpieces which are diffusion bonded and superplastically formed to form an article according to the present invention.

A fan blade 26B, as shown in FIG. 12, comprises an aerofoil shaped body 80B which has a leading edge 82B, a trailing edge 848, a concave surface 86B, a convex surface 88B, a root 90B at a radially inner end and a tip 92B at a radially outer end. The fan blade 26B has a warren girder structure 96B which defines a plurality of internal cavities 94B and the internal cavities 94B may be hollow or may be filled with a vibration damping medium. The fan blade 26B has been manufactured using three titanium alloy workpieces 100B, 101B and 102B, as shown in FIG. 13, and using the diffusion bonding and superplastic forming process according to the present invention. However, in the case of three titanium alloy workpieces 100B, 101B and 102B it is necessary to provide stop off material 122B in a predetermined pattern between the facing surfaces of a first titanium alloy workpiece 100B and a second titanium alloy workpiece 101B and to provide stop off material in a further predetermined pattern between the facing surfaces of the second titanium alloy workpiece 101B and a third titanium alloy workpiece 102B. It is also necessary to provide stop off material 124B in a predetermined position between the facing surfaces of the first titanium alloy workpiece 100B and the second titanium alloy workpiece 101B and to provide a first recess 130B in a second predetermined position on the outer surface of the first titanium alloy workpiece 100B. Alternatively it is possible to provide stop off material 124B in a predetermined position between the facing surfaces of the first titanium alloy workpiece 100E and the second titanium alloy workpiece 101B and to provide a first recess in a second predetermined position on the inner surface of the first titanium alloy workpiece 100B. It may also be necessary to provide stop off material in a predetermined position between the facing surfaces of the second titanium alloy workpiece 101B and the third titanium alloy workpiece 102B and to provide a second recess 132B in a third predetermined position on the outer surface of the third titanium alloy workpiece 102B. Alternatively it is possible to provide stop off material in a predetermined position between the facing surfaces of the second titanium alloy workpiece 101B and the third titanium alloy workpiece 102B and to provide a second recess in a third predetermined position on the inner surface of the third titanium alloy workpiece 102B. Again, in the case of fan blade 26B, the titanium alloy workpieces 100B and 102B taper, increase in thickness, from end 114B to end 116B and the pipe is connected to the end 114B at what will be the radially outer end of the fan blade 26B.

Figure 14:
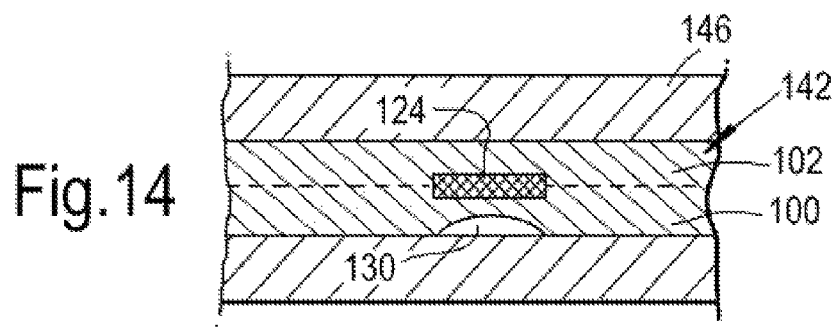
FIG. 14 is an alternative cross-sectional view along line X-X of the sealed integral structure in a superplastic forming die shown in FIG. 6.
Figure 15:
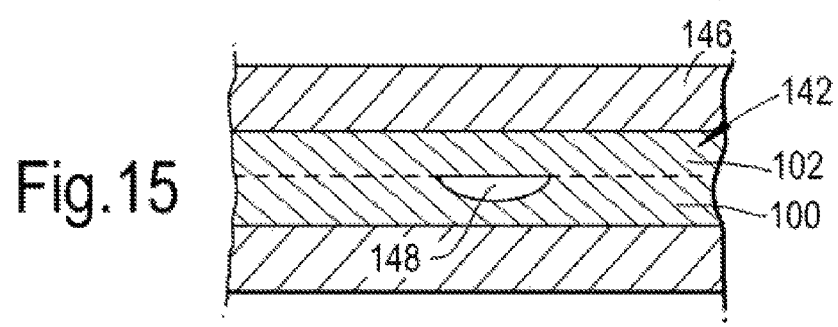
FIG. 15 is an alternative cross-sectional view along line Y-Y of the sealed integral structure in a superplastic forming die shown in FIG. 9.

FIG. 14 illustrates an alternative embodiment of the present invention after the diffusion bonding step, in which a first recess 130 is provided on the second surface of the first titanium alloy workpiece 100 but a second recess is not provided on the fourth surface of the second titanium alloy workpiece 102. FIG. 15 illustrates this embodiment after the superplastic forming step and shows the resulting inflation passage 148.

Figure 16:
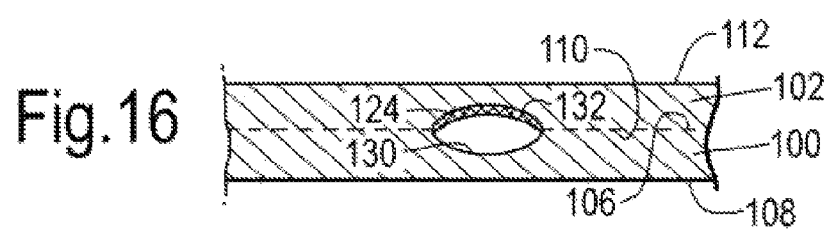
FIG. 16 is a cross-sectional view through an alternative sealed assembly.
Figure 17:
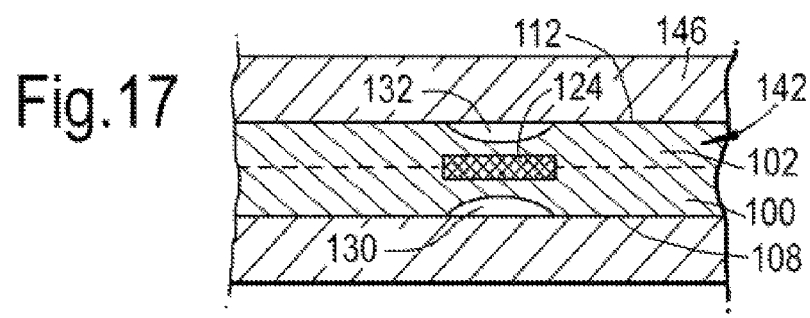
FIG. 17 is a cross-sectional view through a sealed integral structure in a superplastic forming die after diffusion bonding of the sealed assembly shown in FIG. 16.
Figure 18:
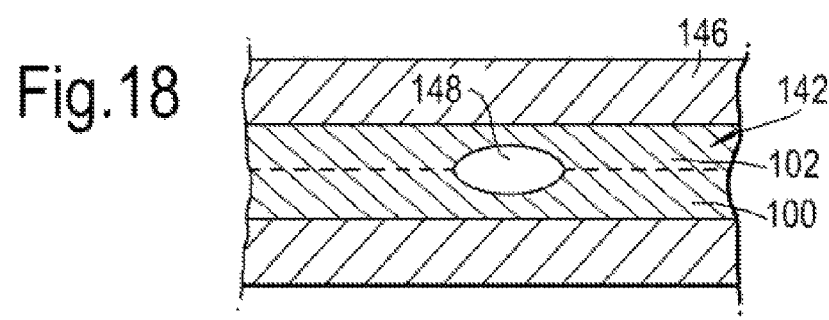
FIG. 18 is a cross-sectional view through the sealed integral structure in a superplastic forming die shown in FIG. 17 after superplastic forming.

FIG. 16 illustrates a further embodiment of the present invention before the diffusion bonding step, in which a first recess 130 is provided on the first surface 106 of the first titanium alloy workpiece 100 and a second recess 132 is provided on the third surface 110 of the second titanium alloy workpiece 102 and the stop off material 124 is provided on the surface of the first and/or the second recesses 130 and 132. FIG. 17 illustrates this embodiment after the diffusion bonding step and shows that the first recess 130 has moved to the second surface 108 of the first titanium alloy workpiece 100 and the second recess 132 has moved to the fourth surface 112 of the second titanium alloy workpiece 102. FIG. 18 illustrates this embodiment after the superplastic forming step and shows the resulting inflation passage 148.

FIG. 19 illustrates another embodiment of the present invention and shows two titanium alloy workpieces 100C and 102C are assembled into a stack 104C. The titanium alloy workpiece 100C has a first surface 106C and a second surface 108C and the titanium alloy workpiece 102C has a third surface 110C and a fourth surface 112C. The first surface 106C is a flat surface and the third surface 110C is a flat surface. The first surface 106C of the titanium alloy workpiece 100C is arranged to abut the third surface 110C of the titanium alloy workpiece 102C. The titanium alloy workpieces 100C and 102C taper, increase in thickness, from end 116C to end 114C. In this example a stop off material 122C in a predetermined pattern between the facing surfaces of a first titanium alloy workpiece 100C and a second titanium alloy workpiece 102C. It is also necessary to provide stop off material 124C in a predetermined position between the facing surfaces of the first titanium alloy workpiece 100C and the second titanium alloy workpiece 102C and to provide a first recess 130C in a second predetermined position on the second surface 108C of the first titanium alloy workpiece 100C. It is to be noted that the first recess 130C extends along the second surface 108C of the first titanium alloy workpiece 100C towards the edge at the end 114C of the first titanium alloy workpiece 100C from a position in the second surface 108C corresponding to a position on the first surface 106C of the first titanium alloy workpiece 100C having stop off material 122C. It is also to be noted that an inflation slot 131C extends along the third surface 110C of the second titanium alloy workpiece 102C towards the edge at the end 114C of the second titanium alloy workpiece 102C from a position in the third surface 110C corresponding to a position on the first surface 106C of the first titanium alloy workpiece 100C having stop off material 122C. The inflation slot 131C has a very small cross-sectional area and has a depth of about 1.5 mm and a width of about 1.5 mm. The first surface 106C of the first titanium alloy workpiece 100C and the third surface 110C of the second titanium alloy workpiece 102C are provided with part circular slots 132C and 133C respectively at the edges at the end 114C of the first titanium alloy workpieces 100C and 102C. The part circular slots 132C and 133C are arranged to receive an end of a pipe used to evacuate the sealed assembly 104C before diffusion bonding. The inflation slot 131C and the stop off material 124C extend along the third surface 110C of the second titanium alloy workpiece 102C and the first surface 106C of the first titanium alloy workpiece 100C respectively towards the edge at the end 114C of the first titanium alloy workpiece 100C to reach the part circular slots 133C and 132C respectively. FIG. 20 shows a cross-sectional view through the sealed assembly 140C showing the arrangement of the first recess 130C, the inflation is slot 131C and the stop off material 124C. FIG. 21 shows a cross-sectional view through the sealed integral structure 142C after diffusion bonding and superplastic forming and shows the resulting inflation passage 148C.

Alternatively it is possible to provide stop off material 124C in a predetermined position between the facing surfaces of the first titanium alloy workpiece 100C and the second titanium alloy workpiece 102C and to provide a first recess in a second predetermined position on the first surface 106C of the first titanium alloy workpiece 100C.

It may be equally possible to provide an inflation slot on either the first surface of the first titanium alloy workpiece or the third surface of the second titanium alloy workpiece in the embodiment in FIGS. 3 to 10 and also in the embodiments in FIGS. 13 to 18.

The advantage of the present invention is that it provides an increased cross-sectional area inflation passage to supply inflation gas to the interior of the sealed integral assembly for superplastic forming of the sealed integral assembly. The present invention also has the advantage that it provides an increased cross-sectional area inflation passage to allow inflation gas to exit the interior of the sealed integral assembly after superplastic forming of the sealed integral assembly. The present invention also has the advantage that it provides an increased cross-sectional area inflation passage to allow gas to enter the interior of the sealed integral assembly during cooling after superplastic forming of the sealed integral assembly to prevent an under formed profile. Thus, the present invention reduces non-conformance of diffusion bonded and superplastically formed components, reduces the forming time of diffusion bonded and superplastically formed components, increases the process capability and minimises implementation costs.

A further advantage of providing a recess on an internal surface of a titanium alloy workpiece is that it provides an increased cross-sectional area passage for removal of the binder during bake out of the binder from the stop off material. However, a disadvantage of providing a recess on an internal surface of the titanium alloy workpiece is that it increases the risk of damaging the surface of the titanium alloy workpiece that is to be diffusion bonded.

Although the present invention has been described with reference to manufacturing fan outlet guide vanes, or fan blades, it is equally applicable to the production of other articles, for example compressor blades, compressor vanes, other gas turbine engine components, heat exchangers etc.

Although the present invention has been described with reference to manufacturing components using titanium alloy workpieces it is equally applicable to the use of other suitable diffusion bondable and superplastically formable metal workpieces or alloy workpieces.

Although the present invention has been described with reference to providing a first recess in a first diffusion bondable and superplastically formable workpiece and a second recess in a second diffusion bondable and superplastically formable workpiece it is possible to provide a single recess in only one of the diffusion bondable and superplastically formable workpieces.

The invention claimed is:

1. A method of manufacturing an article by diffusion bonding and superplastic forming comprising the steps of:—
    a) providing at least a first metal workpiece and a second metal workplace, the first metal workpiece having a first surface and a second surface, the second metal workpiece having a third surface and a forth surface,
    b) applying stop off material to prevent diffusion bonding in a predetermined pattern on the first surface of the first metal workpiece, the predetermined pattern being spaced from the edges of the first surface of the first metal workplace,
    c) applying stop off material to prevent diffusion bonding in a predetermined position on the first surface of the first metal workpiece or the third surface of the second metal workpiece, the predetermined position extending from the predetermined pattern of stop of material on the first surface of the first metal workpiece towards one edge of the first surface of the first metal workpiece,
    d) providing a recess in a second predetermined position on the first surface of the first metal workpiece, the second surface of the first metal workpiece, the third surface of the second metal workpiece or the fourth surface of the second metal workpiece, the recess extending towards the same edge of the first metal workpiece or a corresponding edge of the second metal workpiece,
    e) assembling at least the first metal workpiece and the second metal workpiece in a stack such that the first surface of the first metal workpiece faces the third surface of the second metal workpiece and the recess in the second predetermined position on the first surface of the first metal workplace, the second surface of the first metal workpiece, the third surface of the second metal workpiece or the fourth surface of the second metal workpiece is aligned with the stop off material arranged in the predetermined position on the first surface of the first metal workpiece,
    f) sealing the edges of the first metal workpiece to the edges of the second metal workplace to form a sealed assembly,
    g) evacuating the sealed assembly,
    h) heating and externally pressurising the sealed assembly to diffusion bond the first and second metal workpieces together in areas other than the predetermined pattern and predetermined position to form a sealed integral structure,
    i) connecting an inflation pipe to the stop off material in the first predetermined position on the first surface of the first metal workpiece of the sealed integral structure,
    j) heating and internally pressurising the sealed integral structure to cause the first metal workpiece, or the second metal workpiece, where the stop off material was arranged in the predetermined position and the recess was arranged in the second predetermined position, to be hot formed to create an inflation passage within the sealed integral structure,
    k) heating and internally pressurising the sealed integral structure to cause the first metal workpiece and/or the second metal workpiece where the stop off material was arranged in the predetermined pattern to be superplastically formed to create a hollow metal article.

2. A method as claimed in claim wherein step d) comprises providing a first recess in a second predetermined position on the second surface of the first metal workpiece and a second recess in a third predetermined position on the fourth surface of the second metal workpiece, the first recess extending towards the same edge of the first metal workpiece and the second recess extending towards a corresponding edge of the second metal workpiece, step e) comprises assembling at least the first metal workpiece and the second metal workpiece in stack such that the first recess in the second predetermined position on the second surface of the first metal workpiece and the second recess in fourth surface of the second metal workpiece are aligned with the stop off material arranged in the predetermined position on the first surface of the first metal workpiece and step j) comprises heating and internally pressurising the sealed integral structure to cause the first metal workpiece and the second metal workpiece, where the stop off material was arranged in the predetermined position, the first recess was arranged in the second predetermined position and the second recess was arranged in the third predetermined position, to be hot formed to create an inflation passage within the sealed integral structure.

3. A method as claimed in claim 1 wherein step d) comprises providing a first recess in a second predetermined position on the first surface of the first metal workpiece and a second recess in a third predetermined position on the third surface of the second metal workpiece, the first recess extending towards the same edge of the first metal workpiece and the second recess extending towards a corresponding edge of the second metal workpiece, step e) comprises assembling at least the first metal workpiece and the second metal workpiece in stack such that the first recess in the second predetermined position on the first surface of the first metal workpiece and the second recess in third surface of the second metal workpiece are aligned with the stop off material arranged in the predetermined position on the first surface of the first metal workpiece and step j) comprises heating and internally pressurising the sealed integral structure to cause the first metal workpiece and the second metal workpiece, where the stop off material was arranged in the predetermined position, the first recess was arranged in the second predetermined position and the second recess was arranged in the third predetermined position, to be hot formed to create an inflation passage within the sealed integral structure.

4. A method as claimed in claim 1 wherein step a) comprises providing a third metal workpiece, the third metal workpiece having a fifth surface and a sixth surface, step b) comprises applying stop off material to prevent diffusion bonding in a predetermined pattern on the third surface of the second metal workpiece, the predetermined pattern being spaced from the edges of the third surface of the second metal workpiece, step e) comprises assembling the first metal workpiece, the second metal workpiece and the third metal workpiece in a stack such that the first surface of the first metal workpiece faces the fifth surface of the third metal workpiece, the sixth surface of the third metal workpiece faces the third surface of the second metal workpiece and the recess in the second predetermined position on the first surface of the first metal workpiece, the second surface of the first metal workpiece, the third surface of the second metal workpiece or the fourth surface of the second metal workpiece is aligned with the stop off material arranged in the predetermined position on the first surface of the first metal workpiece.

5. A method as claimed in claim 1 wherein the article is selected from the group consisting of a fan blade and a fan outlet guide vane.

6. A method as claimed in claim 1 wherein the article is selected from the group consisting of a heat exchanger, a compressor blade and a compressor vane.

7. A method as claimed in claim 1 wherein the first metal workpiece, the second metal workpiece or the third metal workpiece comprises a titanium alloy.

8. A method as claimed in claim 7 wherein the titanium alloy consists of 6 wt % vanadium, 4 wt % aluminium and the balance titanium, minor elemental additions and incidental impurities.

9. A method as claimed in claim 1 wherein step d) comprises providing a recess in a second predetermined position on the first surface of the first metal workpiece, the recess extending towards the same edge of the first metal workpiece.

10. A method as claimed in claim 1 wherein step d) comprises providing a recess in a second predetermined position on the second surface of the first metal workpiece, the recess extending towards the same edge of the first metal workpiece.

11. A method as claimed in claim 1 wherein step h) comprises heating to a temperature greater than 850° C. and applying a pressure greater than $20.26 \times 10^5$ Nm$^{-2}$.

12. A method as claimed in claim 11 wherein step h) comprises heating to a temperature between 900° C. and 950° C. and applying a pressure between $20.26 \times 10^5$ Nm$^{-2}$ and $30.39 \times 10^5$ Nm$^{-2}$.

13. A method as claimed in claim 1 wherein step j) and step k) comprise heating to a temperature greater than 850° C.

14. A method as claimed in claim 13 wherein step j) and step k) comprise heating to a temperature between 900° C. and 950° C.

* * * * *